June 7, 1938. P. E. S. REICHARD 2,120,188
ATTACHMENT FOR HEADLIGHTS
Filed Nov. 19, 1936
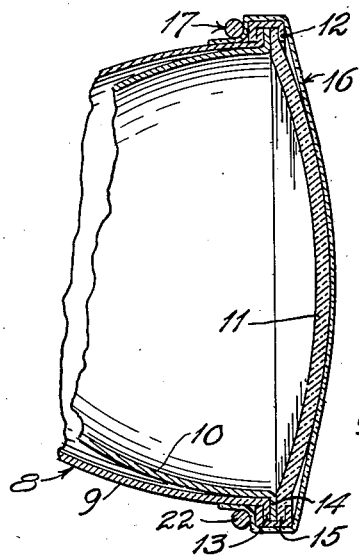
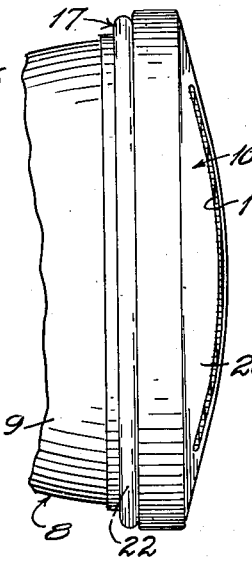
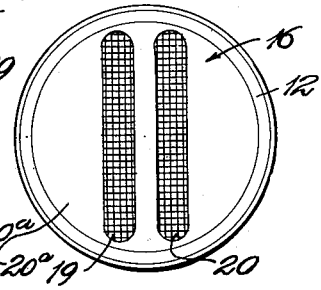
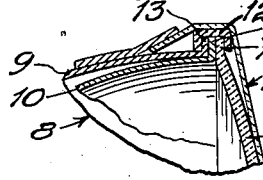
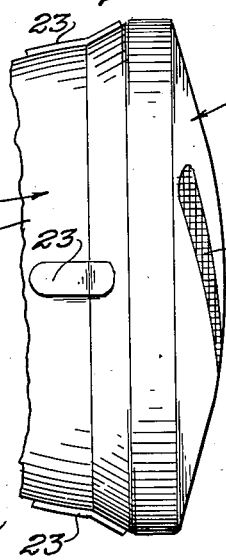
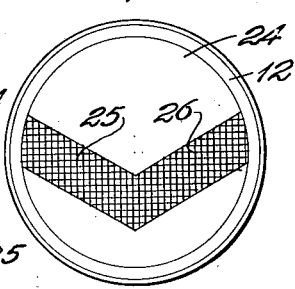
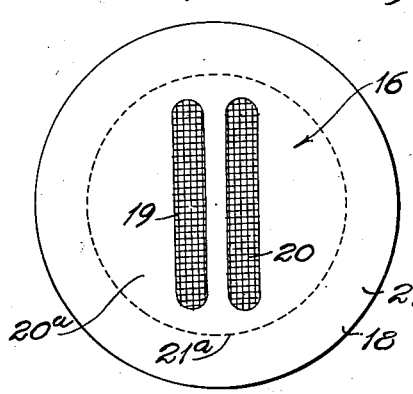
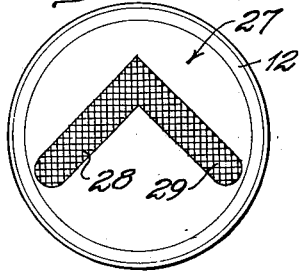
Inventor
Paul E. S. Reichard,
By Kimmel & Crowell,
Attorneys Patented June 7, 1938

2,120,188

UNITED STATES PATENT OFFICE 2,120,188

ATTACHMENT FOR HEADLIGHTS

Paul E. S. Reichard, Freeport, Pa.

Application November 19, 1936, Serial No. 111,721

1 Claim. (Cl. 240—48.4)

This invention relates to an attachment for headlights of automotive vehicles, and has for its object to provide, in a manner as hereinafter set forth, detachable means for extension across the front of a headlight to enable the eyes of a driver to pick out, while driving in a fog, objects otherwise indiscernible thereby insuring for safe driving and reducing the possibility of accidents to a minimum.

The difficulty encountered in driving on the highways in foggy weather is due to the reflecting by the fog particles of the rays from the headlight back to the eyes of the driver creating a dazzling or blinding action. Different types of headlights to overcome the action referred to have been tried with varying success, the most successful, in relation to cost appears to be the auxiliary lights of an amber hue. The attachment, in accordance with this invention, with respect to the auxiliary amber lights, is possibly of a more temporary nature, but virtue is claimed for this very point by an attachment, in accordance with this invention, since fog is usually a temporary thing the attachment may be used and removed as occasion requires.

The invention further aims to provide, in a manner as hereinafter set forth, a headlight attachment for the purpose referred to capable of being readily and detachably installed with respect to and without changing the construction of the form of headlights now generally employed in connection with automotive vehicles.

Further objects of the invention are to provide, in a manner as hereinafter set forth, an attachment for the purpose referred to which is simple in its construction, strong, durable, moisture-proof, thoroughly efficient in its use and inexpensive to manufacture.

To the above ends essentially and to others which may hereinafter appear, the invention consists of the novel construction, combination and arrangement of parts as will be more specifically described and are as illustrated in the accompanying drawing wherein embodiments of the invention are shown, but it is to be understood that changes, variations and modifications may be resorted to which fall within the scope of the invention as claimed.

In the drawing:

Figure 1 is a fragmentary view of a headlight in longitudinal section showing the adaptation therewith of the attachment, Figure 2 is a fragmentary view of a headlight in side elevation showing the adaptation therewith of the attachment, Figure 3 is a front elevation of a headlight provided with the attachment, Figure 4 is a front elevation of the combined light-absorbing and light-cutting-off element of the attachment before the arrangement thereof with respect to the headlight, Figure 5 is a fragmentary view in vertical section of a headlight illustrating a modified form of securing means for the combined light-absorbing and light-cutting-off element, Figure 6 is a fragmentary view in side elevation showing the adaptation therewith of a modified form of attachment, Figure 7 is a front elevation of a headlight provided with the modified form of attachment shown in Figure 6, and Figure 8 is a front elevation of a headlight provided with still another modified form of the attachment.

With reference to Figures 1, 2, 3 and 4 of the drawing, the housing, reflector, lens and lens-retaining band of a headlight 8 are indicated at 9, 10, 11 and 12 respectively. As shown housing 9 and reflector 10 have laterally extended flanges 13, 14 respectively at their outer ends. The flange 14 is arranged forwardly of and abuts flange 13. The marginal portion 15 of lens 11 seats against flange 14. The band 12 is of the inwardly open channel type and when in retaining position bears against the rear side of flange 13 and the front face of marginal portion 15 of lens 11, as well as seats against the edges of flanges 13, 14 and portion 15. The foregoing arrangement of headlight is of known construction.

With reference to Figures 1 to 4, the attachment includes a combined light-absorbing and light-cutting-off element 16 and a retaining element 17 for detachably securing element 16 extending across the front of headlight 8. The element 16 consists of a transparent moisture-proof bendable sheet 18 of any suitable material and hue. Preferably, sheet 18 will be of "Cellophane" and its hue amber. The sheet 18 is provided with means, as at 19, 20 to form it with a pair of spaced parallel bar-like opaque portions. That part 20ª of sheet 18 extended from the opaque portions constitutes a light absorbing means. The opaque portions of sheet 18 constitute light-shutting off means. Preferably, the sheet 18 will be in the form of a circular disc of greater diameter than the diameter of the front end of the headlight. The means 19, 20 will be of like length but of less length than the diameter of sheet 18. The ends of the said means will be spaced equi-distant from the edge of sheet 18. The said means will be disposed adjacent to the opposite sides of the vertical diametric center of sheet 18. The latter is to be positioned against the outer face of the front of the headlight with its marginal portion 21 in endless extended relation with respect to said front. The marginal portion 21 of the sheet 18 is then bent rearwardly to encompass the headlight. The sheet 18 may or may not be provided with an indicating line or scored end upon which the marginal portion 21 is bent to extend rearwardly. The sheet 18 is shown as provided with a circular line or a circular row of scoring, as indicated at 21ª. The retaining element 17 is in the form of a resilient ring 22 which, when in retaining position 21 coacts with the rear side of the band 12 for detachably securing the sheet 18 to the headlight 8 in the position as shown in Figure 3.

With reference to Figure 5 a modified form of retaining means for element 16 is shown and said means consists of a set of flexible spaced strips 23 (only one shown) provided with cementitious material for detachably connecting them to housing 9 and marginal portion 21.

With reference to Figures 6 and 7, a modified form of combined light-absorbing and light-cutting off element is shown and indicated at 24. The difference between element 24 and the element 16 resides solely in the arrangement of the bar-like opaque portions of element 24. The latter is provided with means indicated at 25, 26 to form a pair of bar-like opaque portions extending upwardly at opposite outward inclinations and merging into each other at the lower ends. The means 25, 26 constitute light-cutting off portions and are spaced from the edge of element 24. Aside from that which has been stated relative to element 24, the latter will be constructed and arranged in the same manner as element 16. Element 24 may be detachably secured in position by element 17, but is shown by way of example as being detachably secured to the headlight by the strips 23.

With reference to Figure 8 another modified form of light-absorbing and light-cutting off element is shown and indicated at 27. The difference between elements 27 and 24 resides solely in the arrangement of the bar-like opaque portions of element 27. The latter is provided with means indicated at 28, 29 to form a pair of opaque portions extending downwardly at opposite outward inclinations and merging into each other at their upper ends. The means 28, 29 are of slightly less width and are disposed at a greater inclination than the means 25, 26. Aside from that which has been stated relative to element 27, the latter will be constructed and arranged in the same manner as element 24.

The inwardly arranged circular lines shown in Figures 3, 7, 8 is the lower edge of the front of the band 12 appearing through the elements 16, 24, 27 respectively.

Although the attachment is designed primarily for use in connection with the headlights of automotive vehicles, it is to be understood that it is to be employed in any connection for which it may be found applicable, such by way of example as an attachment for the headlights of locomotives and marine and aerial vessels.

Although the opaque portions are termed bars, it is to be understood that the term refers to an opaque portion of bar-like contour. It is to be further understood that the opaque portions may be of any suitable contour to split the beam into light and dark tracks sharply.

What I claim is:

In combination with a headlight having a reflector housing and a lens carried thereby; a flexible sheet having glare eliminating characteristics engageable against the outer surface of said lens, the marginal portions of said sheet extending rearwardly and about the forward end of said housing, a plurality of flexible strips adhesively carried by said housing adhesively engaging the marginal portions of said sheet to hold said sheet in applied position, and a pair of bars of opaque flexible material attached to and made integral with the rear face of the sheet and extending from one side of the lens to the other side and being substantially V-shape.

PAUL E. S. REICHARD.